United States Patent
Mincu et al.

(10) Patent No.: US 12,134,983 B2
(45) Date of Patent: Nov. 5, 2024

(54) PROCESS FOR USING AN AIR INPUT OF A TURBOREACTOR NACELLE COMPRISING AN AIR INPUT LIP WHICH COMPRISES A PORTION WHICH CAN BE MOVED TO PROMOTE A THRUST INVERSION PHASE

(71) Applicant: SAFRAN AIRCRAFT ENGINES, Paris (FR)

(72) Inventors: Daniel-Ciprian Mincu, Moissy-Cramayel (FR); Mathieu Patrick Jean-Louis Lallia, Moissy-Cramayel (FR); Nicolas Joseph Sirvin, Moissy-Cramayel (FR); Jagoda Alina Worotynska, Moissy-Cramayel (FR); Frederic Dautreppe, Moissy-Cramayel (FR); Anthony Binder, Moissy-Cramayel (FR); Eva Julie Lebeault, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 103 days.

(21) Appl. No.: 17/601,043

(22) PCT Filed: Apr. 8, 2020

(86) PCT No.: PCT/EP2020/060029
§ 371 (c)(1),
(2) Date: Oct. 1, 2021

(87) PCT Pub. No.: WO2020/212225
PCT Pub. Date: Oct. 22, 2020

(65) Prior Publication Data
US 2022/0170429 A1 Jun. 2, 2022

(30) Foreign Application Priority Data
Apr. 17, 2019 (FR) ...................................... 1904089

(51) Int. Cl.
F02C 7/042 (2006.01)
F02K 1/66 (2006.01)

(52) U.S. Cl.
CPC ................. *F02C 7/042* (2013.01); *F02K 1/66* (2013.01)

(58) Field of Classification Search
CPC .................................. F02C 7/042; F02K 1/66
See application file for complete search history.

(56) References Cited

U.S. PATENT DOCUMENTS 3,222,863 A 12/1965 Klees et al.
3,242,671 A * 3/1966 Moorehead ............. F02C 7/042
137/15.1

(Continued)

FOREIGN PATENT DOCUMENTS

EP 1992810 A2 11/2008
EP 3421373 A1 1/2019
GB 1565212 A 4/1980

OTHER PUBLICATIONS

Search Report from FR Intellectual Property Office on related FR application (FR1904089) dated Dec. 17, 2019.

(Continued)

*Primary Examiner* — Ted Kim
(74) *Attorney, Agent, or Firm* — Alumen IP Law PC

(57) ABSTRACT

A process for using an air input of a turboreactor nacelle of an aircraft, comprising an air input lip which comprises at least one fixed portion and at least one portion which can be moved between a first position, in which the air input lip has an aerodynamic profile so as to guide the internal air flow over the internal wall in order to promote a thrust phase, and a second position, in which the portion is displaced in relation to the fixed portion so that the air input lip has a second radial thickness in the second position which is less (Continued)

than the first radial thickness in the first position so as to promote a reverse thrust phase.

7 Claims, 11 Drawing Sheets

(56) References Cited

U.S. PATENT DOCUMENTS

| | | | |
|---|---|---|---|
| 3,652,036 A | | 3/1972 | Sans et al. |
| 3,664,612 A | * | 5/1972 | Skidmore et al. ...... F02C 7/042 244/53 B |
| 3,750,689 A | * | 8/1973 | Britt ..................... F02C 7/042 137/15.1 |
| 4,147,029 A | * | 4/1979 | Sargisson ............... F02C 7/042 244/54 |
| 5,014,933 A | | 5/1991 | Harm |
| 5,568,724 A | * | 10/1996 | Lindner ................... F02K 1/66 60/226.2 |
| 2008/0283676 A1 | * | 11/2008 | Jain ...................... F02C 7/042 244/53 B |
| 2009/0008508 A1 | * | 1/2009 | Jain ...................... F02C 7/042 244/53 B |
| 2014/0363276 A1 | | 12/2014 | Vetters et al. |
| 2015/0030446 A1 | * | 1/2015 | Gonidec ............... F02C 7/042 137/15.1 |

OTHER PUBLICATIONS

International Search Report and Written Opinion on corresponding PCT application (PCT/EP2020/060029) from International Searching Authority (EPO) dated Jul. 27, 2020.

* cited by examiner

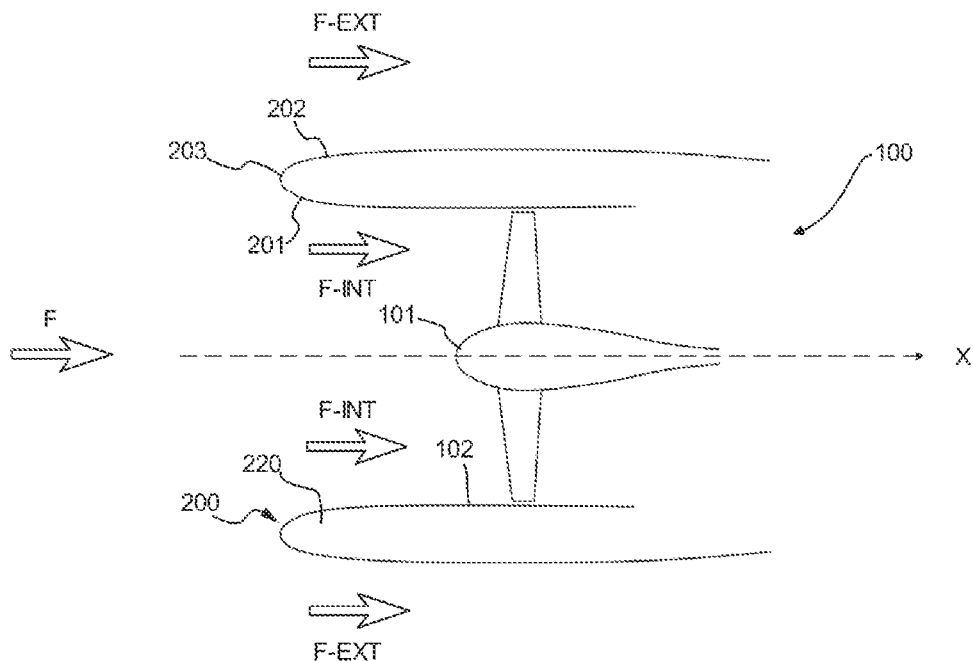
FIGURE 1 - PRIOR ART
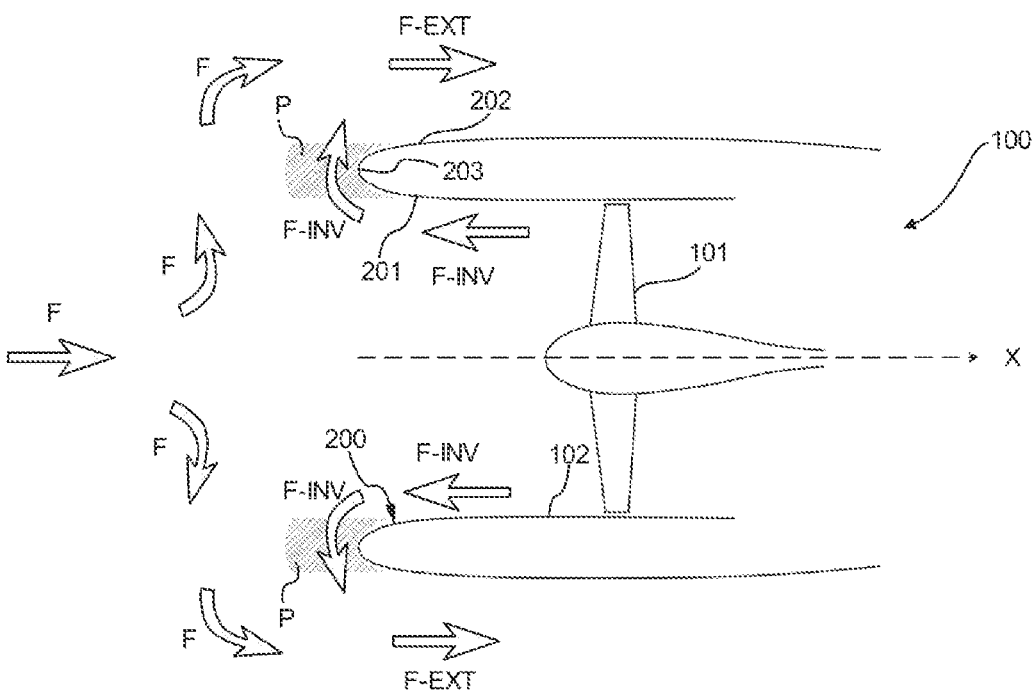
FIGURE 2 - PRIOR ART

PROCESS FOR USING AN AIR INPUT OF A TURBOREACTOR NACELLE COMPRISING AN AIR INPUT LIP WHICH COMPRISES A PORTION WHICH CAN BE MOVED TO PROMOTE A THRUST INVERSION PHASE

TECHNICAL FIELD

The present invention relates to the field of aircraft turbojet engines and is more particularly directed to an air intake of an aircraft turbojet engine nacelle.

In a known manner, an aircraft comprises one or more turbojet engines to enable its propulsion by acceleration of an air flow that circulates from upstream to downstream in the turbojet engine.

With reference to FIG. 1, a turbojet engine 100 is represented, extending along an axis X and comprising a fan 101 rotatably mounted about axis X in an external shell 102 in order to accelerate, during the thrust of the turbojet engine 100, an air flow circulating from upstream to downstream in the turbojet engine 100, referred to as the internal air flow F-INT. Hereinafter, the terms "upstream" and "downstream" are defined with respect to the circulation of the internal air flow F-INT.

In a known manner, the turbojet engine 100 comprises a nacelle comprising at its upstream end an air intake 200 comprising an internal wall 201 pointing to axis X and an external wall 202 opposite to the internal wall 201. The walls 201, 202 are connected by an air intake lip 203, which comprises a leading edge, so as to form an annular cavity 220. The air intake 200 has an aerodynamic profile for separating an upstream air flow F into the internal air flow F-INT guided by the internal wall 201 and an external air flow F-EXT guided by the external wall 202. Hereinafter, the terms "internal" and "external" are defined radially with respect to axis X of the turbojet engine 100.

In order to reduce braking distance of an aircraft, especially during landing, it is known to integrate in a nacelle a thrust reversal system for modifying the orientation of the air flow at the exhaust so as to allow a thrust reversal phase. In a known way, a reverse thrust is achieved by opening flaps and/or grilles in the secondary stream, downstream of the straighteners, in order to lead the air flows radially outwardly or upstream.

For a high bypass ratio turbojet engine, the nacelle has a large diameter and it is not desired to integrate a conventional thrust reversal system since this would be significantly detrimental to the weight, overall size and drag of the turbojet engine.

To allow a thrust reversal phase, another solution consists in providing a Variable Pitch Fan, or VPF, so as to make it possible to reverse the air flow circulating in the secondary stream of a turbojet engine and thus create a reverse thrust allowing the aircraft to decelerate during landing.

With reference to FIG. 2, during a thrust reversal phase, a reverse air flow F-INV circulates from downstream to upstream in the turbojet engine 100, that is, reversely to the internal air flow F-INT of FIG. 1. More precisely, the reverse air flow F-INV circulates between the head of the fan vanes 101 and the external shell 102. The reverse air flow F-INV is guided upstream by the internal wall 201 in a direction that is substantially axial with respect to axis X. This reverse air flow F-INV then opposes the upstream air flow F, thereby allowing the thrust reversal.

In practice, as illustrated in FIG. 2, part of the reverse air flow F-INV bypasses the aerodynamic profile of the air intake 200 along a substantially radial direction, which causes the occurrence of a local depression zone P in the vicinity of the air intake lip 203. Such a local depression P generates an upstream suction, that is, a force that opposes the reverse thrust. In practice, this phenomenon very significantly affects the thrust reversal phase.

The invention thus aims at suppressing this phenomenon in order to increase the performance of the turbojet engine during a thrust reversal phase without affecting the performance of said aircraft during a thrust phase, that is when the flow is not reversed.

In prior art from patent applications U.S. Pat. Nos. 5,014,933A, 3,652,036A and EP3421373A1, an air intake comprising an upstream portion that can be translationally moved to improve air circulation during the thrust phase, especially during takeoff and/or landing, is known.

From patent application EP1992810A2, an air intake of flexible in length and thickness to adapt to operating conditions during the thrust phase is also known.

From patent application US2014/363276A1, an air intake in the form of a blade forming a thin nacelle in order to improve the air supply during the thrust phase is also known. Such an air intake does not promote the thrust reversal phase.

In the remote field of hovercrafts, from patent application GB1565212A, a propeller mounted in a fairing whose upstream end shape is changeable by virtue of an inflatable member is known.

SUMMARY

The invention relates to a method for operating an air intake of an aircraft turbojet engine nacelle extending along an axis X oriented from upstream to downstream in which an internal air flow circulates from upstream to downstream during a thrust phase and a reverse air flow from downstream to upstream during a thrust reversal phase, the air intake circumferentially extending about axis X and comprising an internal wall pointing to axis X and configured to guide the internal air flow and the reverse air flow, and an external wall, opposite to the internal wall, and configured to guide an external air flow, the internal wall and the external wall being connected by an air intake lip so as to form an annular cavity, the air intake lip comprising at least one fixed portion and at least one portion movable between a first position and a second position.

When the at least one movable portion of the air intake lip is in the first position, wherein the air intake lip has an aerodynamic profile so as to guide the internal air flow over the internal wall to promote a thrust phase and wherein the air intake lip has a first radial thickness, the method comprises, during a thrust reversal phase of said turbojet engine, a step of moving the movable portion relative to the fixed portion to the second position so that the air intake lip has a second radial thickness that is less than the first radial thickness so as to promote reverse thrust.

By virtue of the invention, the air intake lip is modified between a thrust phase and a reverse thrust phase. Advantageously, during a thrust reversal phase, the radial thickness of the lip is reduced and makes it possible to form a discontinuity/irregularity in the air flow, thereby preventing the reverse air flow from intimately following the shape of the air intake lip and generating a local depression as well as a force opposing the reverse thrust, as in prior art. In other words, the reverse air flow is advantageously separated from the air intake lip during a reverse thrust.

Preferably, the movable portion is rigid. A rigid portion opposes to an elastic envelope.

According to one aspect of the invention, the air intake lip comprises a plurality of movable portions distributed at the circumference of the air intake about axis X, in order to reduce drag.

According to one aspect of the invention, the air intake lip comprises a single movable portion circumferentially extending about axis X, ensuring a homogeneous reverse air flow separation over the entire circumference of the air lip.

According to one aspect of the invention, with the air intake lip comprising a radially internal portion and a radially external portion in a same longitudinal plane, at least one of said portions is rotatably movable between the first position and the second position. Preferably, the radially internal portion and the radially external portion are movable.

According to one aspect of the invention, at least one movable portion is rotatably hinged between the first position and the second position.

According to one aspect of the invention, the air intake lip comprising a first radially internal portion and a second radially external portion, one of said portions is rotatably hinged between the first position and the second position. Thus, only a portion of the air intake lip is moved to form a discontinuity.

Preferably, the first radially internal portion and the second radially external portion are positioned in a same plane transverse to axis X, in particular, at the same angular position.

According to one aspect of the invention, the air intake lip comprising a radially internal portion and a radially external portion, both portions are rotatably hinged between the first position and the second position.

Preferably, the deflection can be homogeneous (uniform deflection at the circumference) or heterogeneous (different degree of deflection at the circumference). By way of example of heterogeneous deflection, the movable portions may be extended at different degrees at the circumference.

Preferably, the radially internal portion and the radially external portion are separated by a rectilinear interface line, preferably aligned with axis X so as to form a sharp discontinuity for reverse air flow.

According to one aspect of the invention, the air intake lip comprising an upstream portion rotatably hinged between the first position and the second position.

According to one aspect of the invention, at least one movable portion is translationally mounted between the first position and the second position, preferably along axis X.

According to one aspect of the invention, the air intake lip comprising a radially internal portion and a radially external portion, one of said portions is translationally mounted between the first position and the second position. Thus, only part of the air intake lip is moved to form a discontinuity.

Preferably, the radially internal portion and the radially external portion are separated by a rectilinear interface line, preferably aligned with axis X so as to form a sharp discontinuity for circulation of the reverse air flow.

According to one aspect of the invention, the air intake comprises at least one controllable moving member in order to move the movable portion from the first position to the second position.

According to one aspect of the invention, said turbojet engine comprises a fan configured to provide reverse thrust. Preferably, the fan comprises variable pitch vanes.

The invention also relates to an air intake of an aircraft turbojet engine nacelle extending along an axis X oriented from upstream to downstream in which an internal air flow circulates from upstream to downstream during a thrust phase and a reverse air flow from downstream to upstream during a thrust reversal phase, the air intake circumferentially extending about axis X and comprising an internal wall pointing to axis X and configured to guide the internal air flow and the reverse air flow, and an external wall, opposite to the internal wall, and configured to guide an external air flow, the internal wall and the external wall being connected by an air intake lip so as to form an annular cavity, the air intake lip comprising at least one fixed portion and at least one portion that is movable between:
- a first position, in which the air intake lip has an aerodynamic profile so as to guide the internal air flow over the internal wall to promote thrust, the air intake lip having a first radial thickness, and
- a second position in which the movable portion is moved to the second position relative to the fixed portion so that the air intake lip has a second radial thickness that is less than the first radial thickness to promote reverse thrust.

BRIEF DESCRIPTION OF THE DRAWINGS

The invention will be better understood upon reading the following description, given by way of example only, and referring to the appended drawings given as non-limiting examples, in which identical references are given to similar objects and in which:

FIG. 1 is a schematic representation in a longitudinal cross-section view of a turbojet engine nacelle during a thrust phase, according to prior art,
FIG. 2 is a schematic representation in a longitudinal cross-section view of a turbojet engine nacelle during a thrust reversal phase, according to prior art.

It should be noted that the figures set out the invention in detail to implement the invention, said figures of course being capable of serving to better define the invention where appropriate.

DETAILED DESCRIPTION

Figure 3:
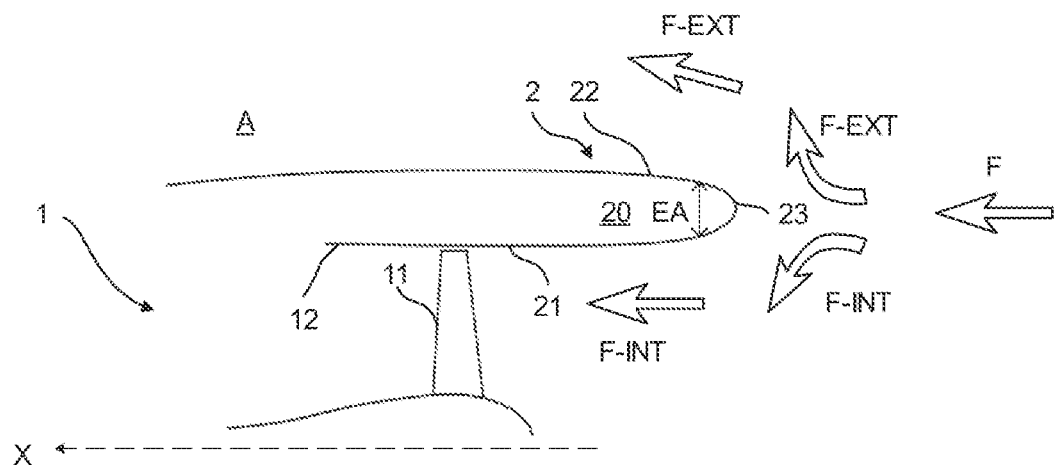
FIG. 3 is a schematic representation in a longitudinal cross-section view of a turbojet engine nacelle during a thrust phase, according to the invention.
Figure 4:
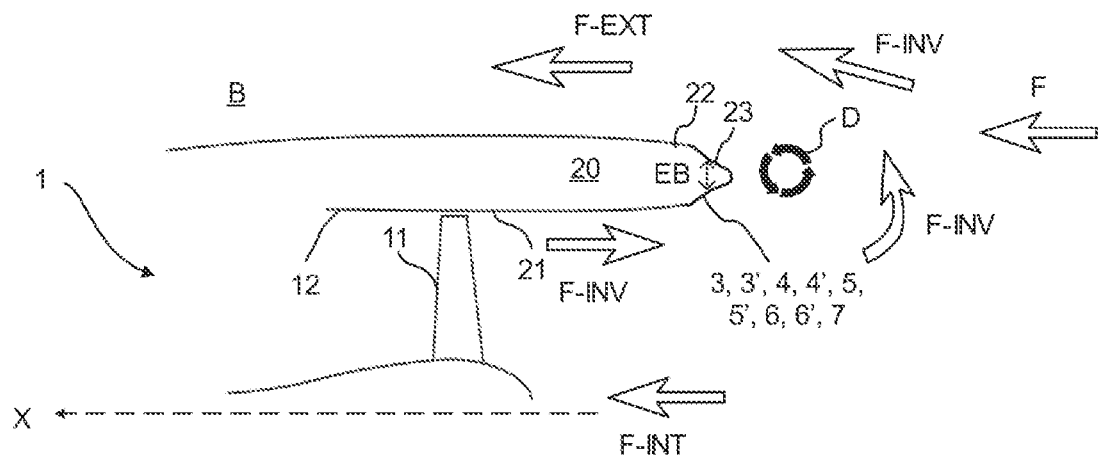
FIG. 4 is a schematic representation in a longitudinal cross-section view of a turbojet engine nacelle during a thrust reversal phase, according to the invention.

With reference to FIGS. 3 and 4, a turbojet engine 1 according to the invention is represented, extending along an axis X oriented from upstream to downstream and comprising a fan 11 rotatably mounted about axis X in an external shell 12 defining an air stream. In a known manner, the fan 11 is configured, during a thrust phase, to accelerate an air flow circulating from upstream to downstream in the turbojet engine 1, known as the internal air flow F-INT (FIG. 3), and during a thrust reversal phase, to accelerate an air flow circulating from downstream to upstream in the turbojet engine 1, known as the reverse air flow F-INV (FIG. 4). In practice, the reverse air flow F-INV circulates from downstream to upstream in a radially external portion of the air stream, in particular, over ⅓ of the air stream radius. An internal air flow F-INT always circulates from upstream to downstream in a radially internal portion of the air stream, in particular, over ⅔ of the air stream radius. The internal air flow F-INT ensures a sufficient flow rate to avoid any pumping phenomenon of the turbojet engine.

As illustrated in FIG. 3, the turbojet engine 1 comprises a nacelle which comprises at its upstream end an air intake 2 circumferentially extending about axis X and comprising an internal wall 21, pointing to axis X and configured to guide the internal air flow F-INT and the reverse air flow F-INV, and an external wall 22, opposite to the internal wall 21 and configured to guide an external air flow F-EXT. The walls 21, 22 are connected by an air intake lip 23, forming an annular cavity 20.

In this example, the turbojet engine 1 comprises thrust reversing means, in particular, a variable pitch fan 11, or VPF, so as to make it possible to reverse the air flow on a radially external portion of the air stream and thus create a reverse thrust allowing the deceleration of the aircraft during landing.

According to the invention, with reference to FIGS. 3 and 4, the air intake lip 23 comprises at least one fixed portion and at least one portion 3, 3', 4, 4', 5, 5', 6, 6', 7 movably mounted between:

a first position A (FIG. 3), in which the air intake lip 23 has an aerodynamic profile so as to guide the internal air flow F-INT over the internal wall 21 to promote thrust, the air intake lip 23 having a first radial thickness EA in the first position A, and a second position B (FIG. 4), wherein portion 3, 3', 4, 4', 5, 5', 6, 6', 7 is moved relative to the fixed portion such that air intake lip 23 has a second radial thickness EB in the second position B that is less than the first radial thickness EA.

The radial thicknesses EA, EB are measured in a same plane transverse to axis X, in particular, at the same angular position.

Advantageously, in the first position A, the movable portion 3, 3', 4, 4', 5, 5', 6, 6', 7 does not affect the aerodynamic performance of the air intake lip 23. The thrust is thus optimal.

As a result of its movement, in the second position B, the radial thickness of the air intake lip is reduced and no longer has an aerodynamic profile, which makes it possible to improve the separation D of the reverse air flow F-INV. In other words, the entire reverse air flow F-INV is guided so as to circulate in a substantially axial direction with respect to axis X in order to oppose an upstream air flow F, originating the reverse thrust. There is no longer a strong local depression P as in prior art that reduces the performance of the reverse thrust. A thinner internal air intake lip 23 promotes separation as opposed to a thick air intake lip 23 with an aerodynamic profile.

Figure 5:
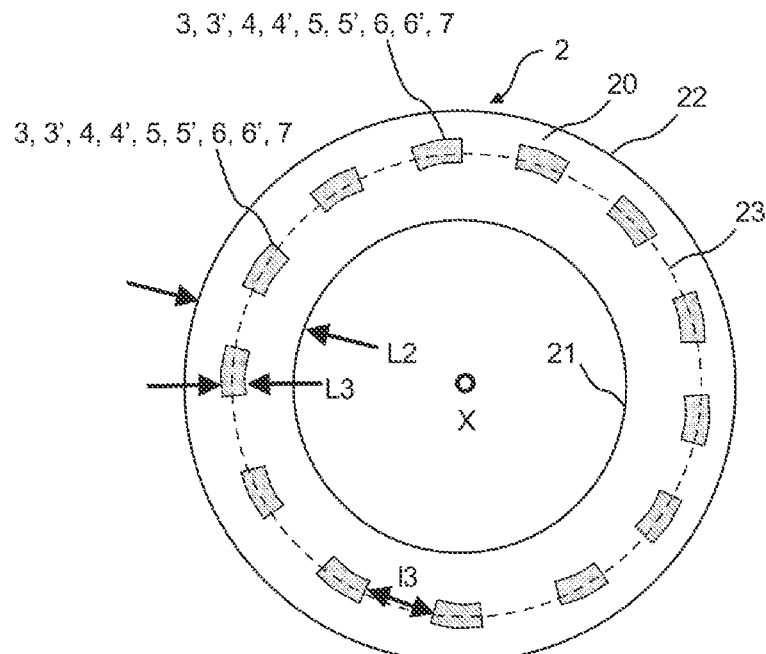
FIG. 5 is a schematic representation in a transverse cross-section view of an air intake comprising a row of movable portions.

With reference to FIG. 5, an air intake lip 23 is represented comprising a plurality of movable portions 3, 3', 4, 4', 5, 5', 6, 6', 7 that are distributed at the circumference of the air intake 2 about axis X so as to allow for improved thrust reversal phase homogeneously at the circumference of the air intake 2. Preferably, with reference to FIG. 5, the azimuthal length of a movable portion 3, 3', 4, 4', 5, 5', 6, 6', 7 is such that its surface is of low overall size, light and easily extendable.

Preferably, the azimuthal spacing 13 between two consecutive movable portions 3, 3', 4, 4', 5, 5', 6, 6', 7 is sufficiently small so that the movable portions 3, 3', 4, 4', 5, 5', 6, 6', 7 cover a maximum azimuthal surface area when extended without overlap. Preferably, the number of movable portions 3, 3', 4, 4', 5, 5', 6, 6', 7 is large enough to allow for a separation D over the entire circumference of the air intake 2 and small enough to reduce weight and drag.

When inwardly extending the movable portions 3, 3'. 4, 4', 5, 5', 6, 6', 7, the shape and number of movable portions are adapted to allow for circumferential, homogeneous or heterogeneous extension without overlap. An outward extension of the movable portions 3, 3', 4, 4'. 5, 5', 6, 6', 7 is less restrictive.

Preferably, the movable portions 3, 3', 4, 4', 5, 5', 6, 6', 7 are organized in rows, each row comprising a plurality of movable portions 3, 3', 4, 4', 5, 5', 6, 6', 7 positioned at a same radial distance from axis X. By way of example, a single row is represented in FIG. 5, but it goes without saying that the number of rows could be higher. The use of several rows, in particular staggered rows, makes it possible to achieve a substantially continuous deflection along the circumference of the air intake 2 while using movable portions 3, 3', 4, 4', 5, 5', 6, 6', 7 spaced apart from each other which are simpler to maintain.

Preferably, with reference to FIG. 5, in the first position A, the ratio L3/L2, where parameter L3 is the radial thickness of a movable portion 3, 3', 4, 4', 5, 5', 6, 6', 7 and parameter L2 is the radial thickness of the air intake 2, is between 0.25 and 1.

Figure 6:
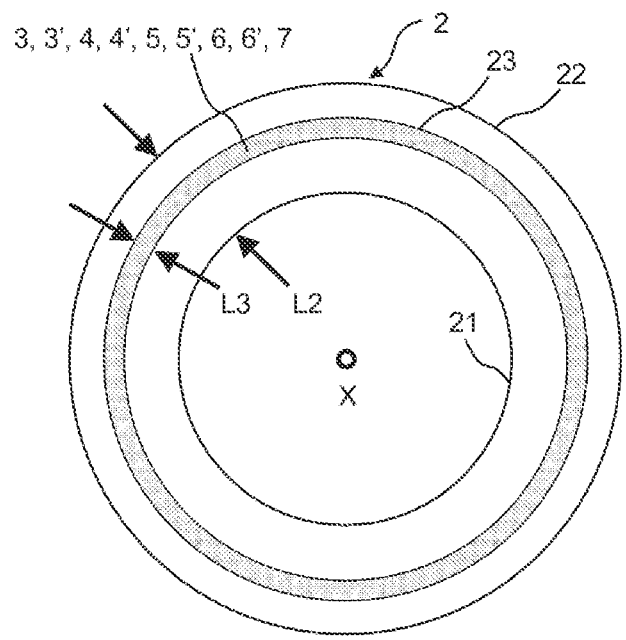
FIG. 6 is a schematic representation in a transverse cross-section view of an air intake comprising a single circumferential movable portion.

Alternatively, with reference to FIG. 6, the air intake 2 comprises a single movable portion 3, 3', 4, 4', 5, 5', 6, 6', 7 circumferentially extending about axis X. Such a movable portion 3, 3', 4, 4', 5, 5', 6, 6', 7 ensures a regular deflection during thrust reversal at the circumference of the air intake 2. It goes without saying that the deflection could also be heterogeneous at the circumference in order to orient the reverse air flow F-INV.

The invention will be better understood when describing the different embodiments. The different aspects of the invention are described hereinafter according to several embodiments, set forth successively and solely by way of example. It goes without saying that the invention is not limited to these embodiments but encompasses any possible combination of the various technical characteristics of the embodiments set forth.

Figure 7A:
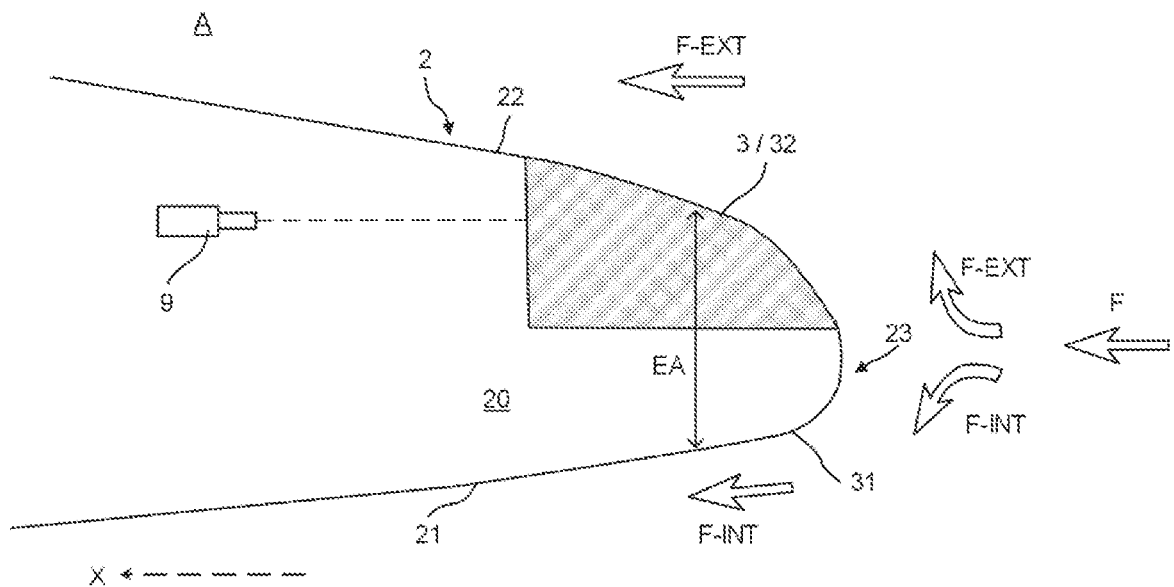
FIG. 7A and
FIG. 7B are schematic representations in a longitudinal cross-section view of an air intake comprising an upper movable portion translationally mounted, according to a first position and a second position.
Figure 7B:
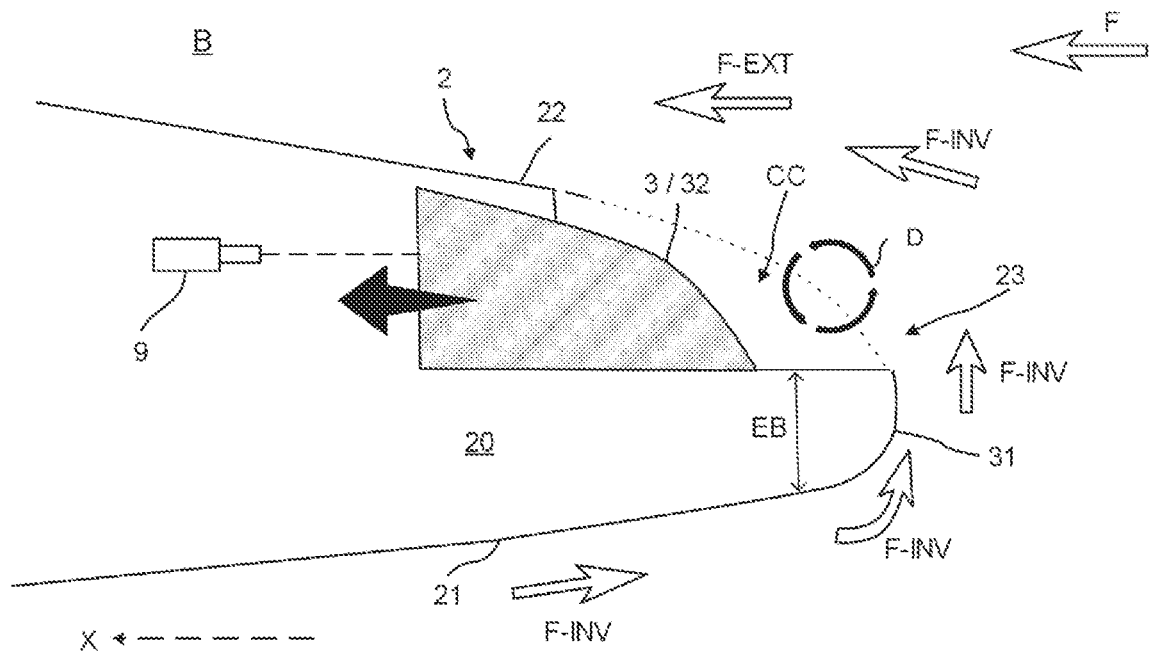

According to a first embodiment illustrated in FIGS. 7A and 7B, a movable portion 3 which is translatable, in particular, along a direction parallel to axis X, is represented. Nevertheless, it goes without saying that the translation axis could be tilted with respect to axis X.

As illustrated in FIGS. 7A and 7B, the air intake lip 23 comprises a radially internal portion 31 and a radially external portion 32. In this example, the radially internal portion 31 is fixed while the radially external portion 32 is movable and forms the movable portion 3. In this embodiment, the movable portion 3 accounts for 50% of the radial thickness EA of the air intake lip 23. Preferably, the movable portion 3 accounts for 5% to 70% of the radial thickness EA of the air intake lip 23. The movable portion 3 should be sufficiently solid to allow it to withstand forces during operation.

The radially internal portion 31 and the radially external portion 32 are separated by a rectilinear interface line, preferably aligned with axis X so as to form a sharp discontinuity for the circulation of the reverse air flow F-INV.

In this example, the air intake 2 comprises a controllable moving member 9 in order to translationally move the movable portion 3 from the first position A to the second position B. By way of example, this controllable moving member 9 is in the form of a hydraulic, electric or other actuator in order to allow a movement as a result of receiving a control command from a calculator. Preferably, the controllable moving member 9 also allows translational movement of the movable portion 3 from the second position B to the first position A. The air intake 2 may comprise one or more controllable moving members 9.

Still referring to FIGS. 7A and 7B, the controllable moving member 9 allows the external movable portion 3, 32 to be moved downstream in order to reduce the radial thickness of the air intake lip 23. In the second position B (FIG. 7B), the radial thickness EB of the air intake lip 23 is reduced by half compared to the radial thickness EA in the first position A (FIG. 7A). In the second position B, a cavity CC is formed in place of the movable portion 3 in its first position A.

As illustrated in FIG. 7B, a thinner internal air intake lip 23 causes a separation D of the reverse air flow F-INV as it circulates from the internal wall 21 to the external wall 22. Because of its separation D, the reverse air flow F-INV does not intimately follow the shape of the air intake lip 23 and is spaced apart from it, which avoids any formation of a strong local depression as in prior art. In other words, the performance during the thrust reversal phase is increased.

Figure 8A:
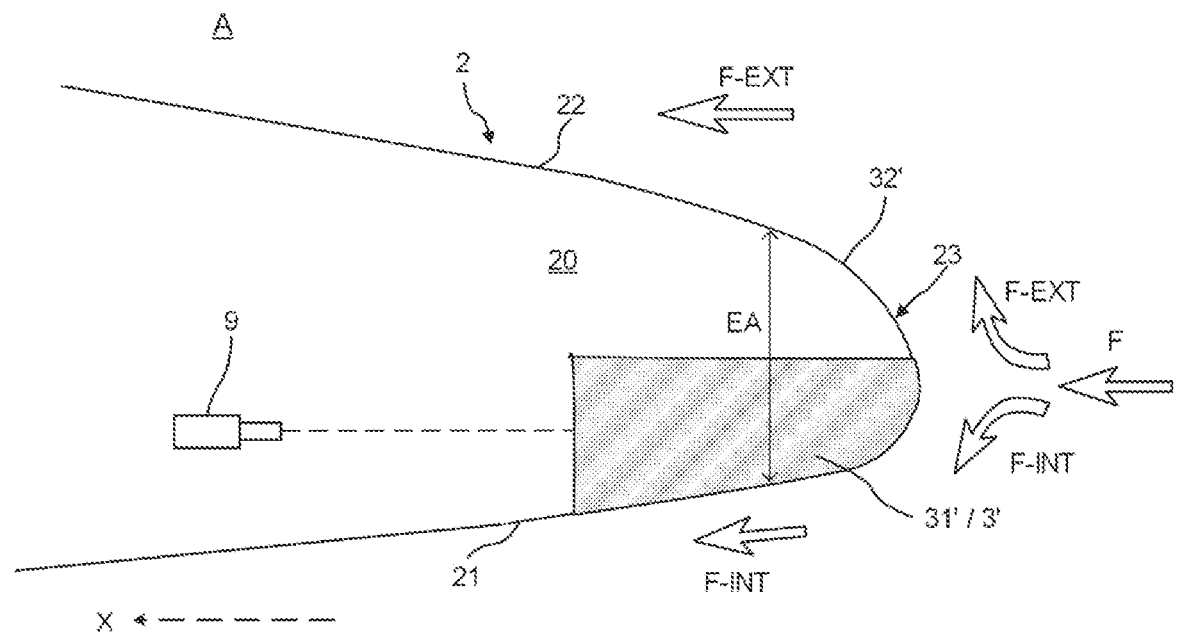
FIG. 8A and
FIG. 8B are schematic representations in a longitudinal cross-section view of an air intake comprising an internal movable portion translationally mounted, according to a first position and a second position.
Figure 8B:
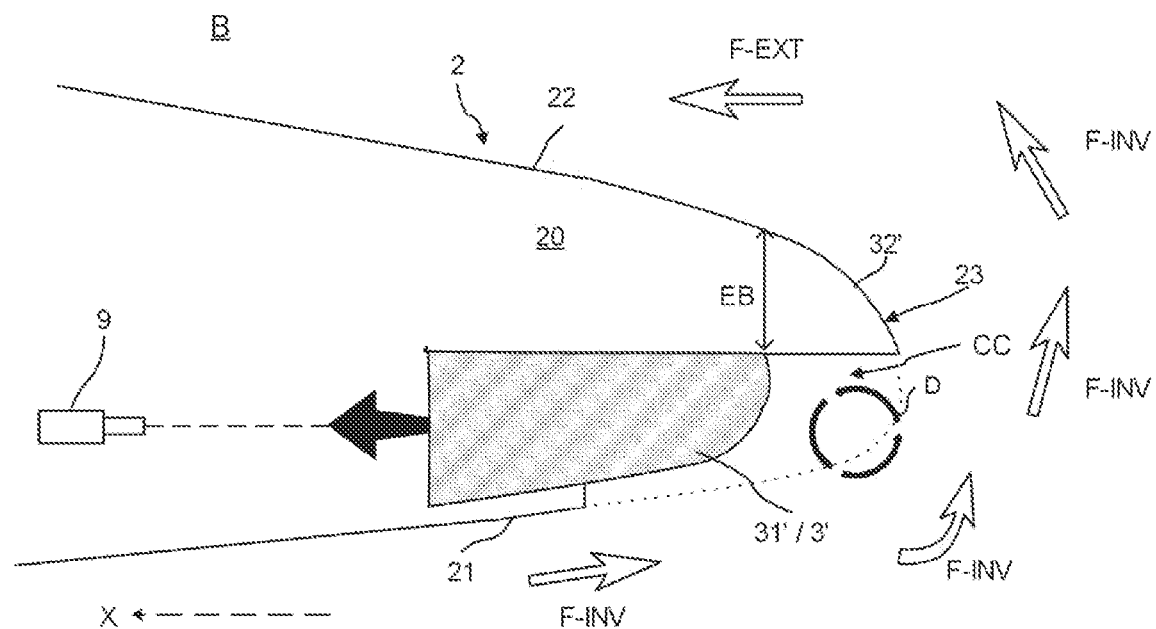

With reference to FIGS. 8A and 8B, another alternative embodiment is represented. For the sake of clarity, analogous numerical references are used to denote elements of the same or similar functions or structures.

With reference to FIGS. 8A and 8B, the radially external portion 32' is fixed while the radially internal portion 31' is movable and forms the movable portion 3'. As illustrated in FIG. 8B, the thinner internal air intake lip 23 causes separation D of the reverse air flow F-INV as it circulates from the internal wall 21 to the external wall 22. Due to its separation D, the reverse air flow F-INV does not intimately follow the shape of the air intake lip 23 and is spaced apart from it, thus avoiding the formation of a strong local depression as in prior art.

Figure 9A:
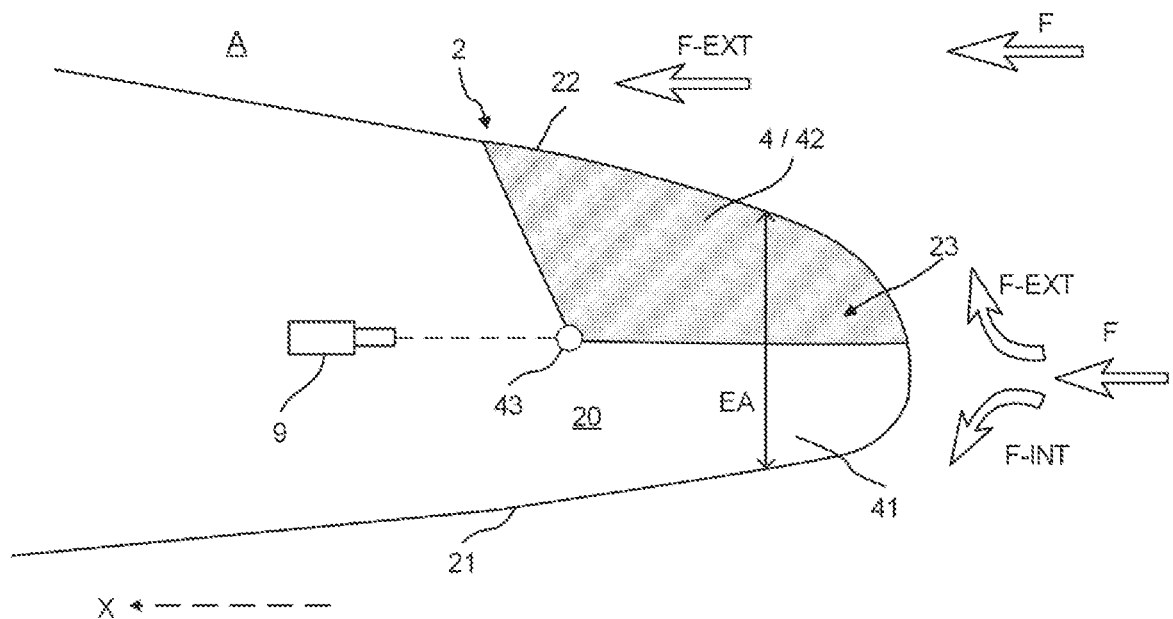
FIG. 9A and
FIG. 9B are schematic representations in a longitudinal cross-section view of an air intake comprising an external movable portion outwardly rotatably mounted, according to a first position and a second position.
Figure 9B:
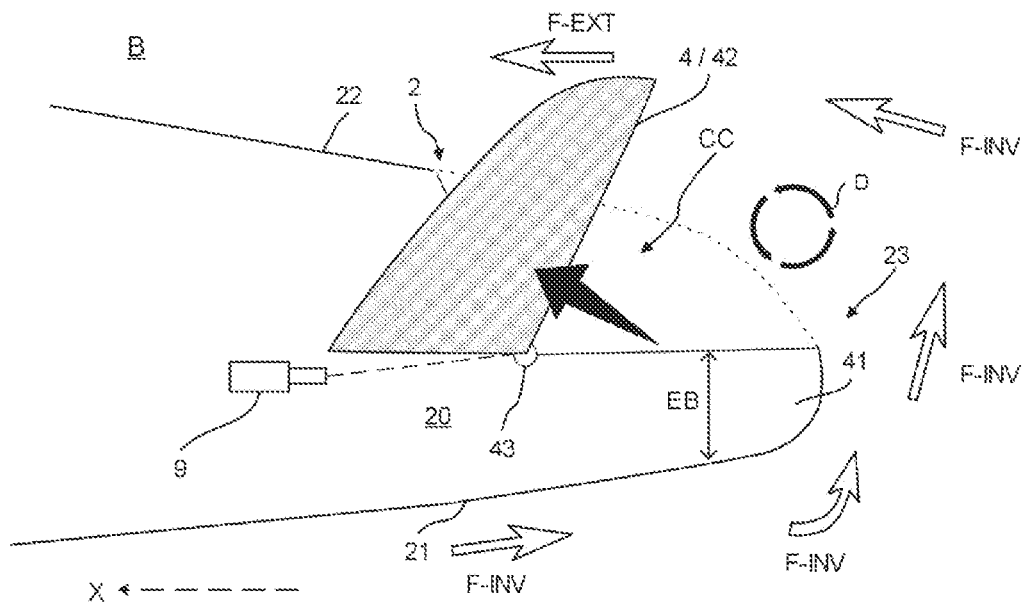

According to a second embodiment, with reference to FIGS. 9A and 9B, a movable portion 4 which is rotatably moved about an azimuthal axis, orthogonal to axis X so as to allow the movable portion 4 to move radially outwardly, is represented.

As illustrated in FIGS. 9A and 9B, the air intake lip 23 comprises a radially internal portion 41 and a radially external portion 42. In this example, the radially internal portion 41 is fixed while the radially external portion 42 is movable and forms the movable portion 4. The movable portion 4 is hinged to the fixed portion 41 by a hinge 43, with an azimuthal axis, which is placed downstream of the upstream end of the air intake lip 23 in the annular cavity 20, that is, between both walls 21, 22. In this embodiment, the movable portion 4 accounts for 50% of the radial thickness of the air intake lip 23. Preferably, the movable portion 4 accounts for 5% to 70% of the radial thickness EA of the air intake lip 23. The radially internal portion 41 and the radially external portion 42 are separated by a rectilinear interface line, preferably aligned with axis X so as to form a sharp discontinuity for the circulation of the reverse air flow F-INV.

In a manner analogous to the foregoing, the air intake 2 comprises a controllable moving member 9 in order to rotatably move the movable portion 4 from the first position A to the second position B. Preferably, the controllable moving member 9 is also for moving the movable portion 4 from the second position B to the first position A. The air intake 2 may comprise one or more controllable moving members 9.

Still referring to FIGS. 9A and 9B, the controllable moving member 9 allows the external movable portion 4, 42 to move radially outwardly downstream in order to reduce the radial thickness of the air intake lip 23. In the second position B, the radial thickness EB of the air intake lip 23 is reduced by half compared to the radial thickness EA in the first position A. In the second position B, a cavity CC is formed in place of the movable portion 4 in its first position A.

As illustrated in FIG. 9B, a thinner internal air intake lip 23 causes separation D of the reverse air flow F-INV as it circulates from the internal wall 21 to the external wall 22. Due to its separation D, the reverse air flow F-INV does not intimately follow the shape of the air intake lip 23 and is spaced apart from it, thus avoiding the formation of a strong local depression as in prior art. In other words, the performance during thrust reversal is increased.

Figure 9C:
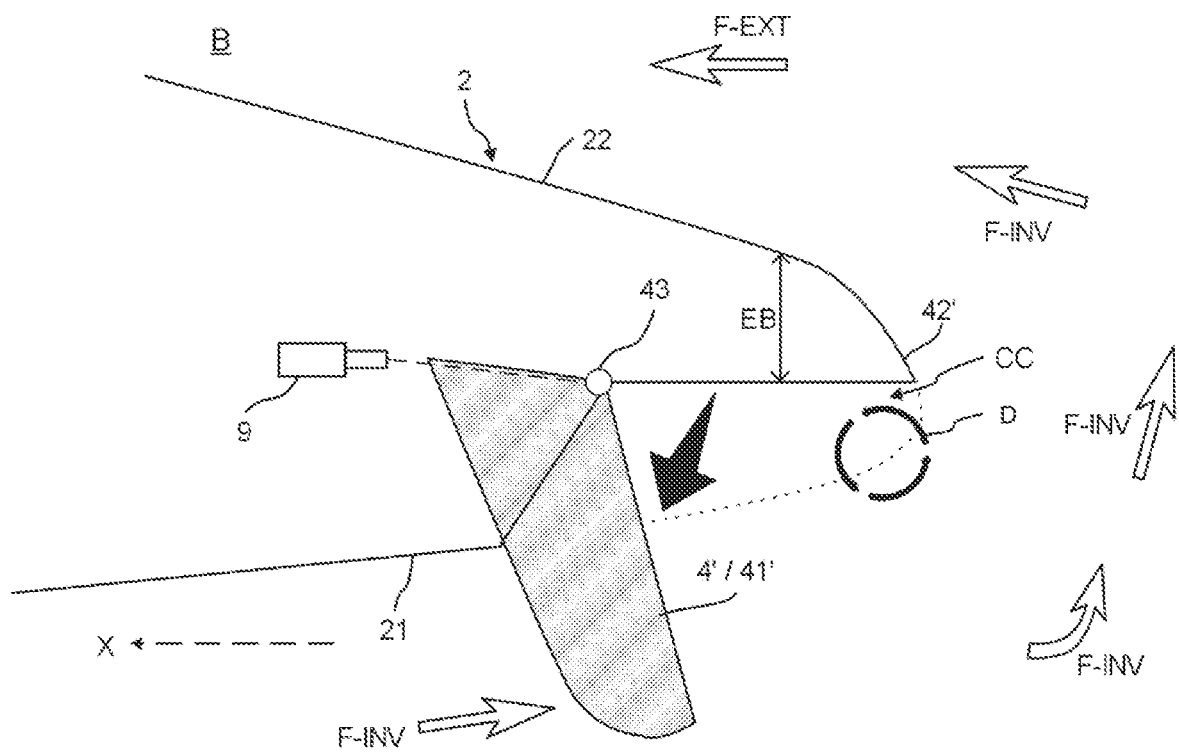
FIG. 9C is a schematic representation in a longitudinal cross-section view of an air intake comprising an internal movable portion inwardly rotatably mounted, according to a second position.

With reference to FIG. 9C, an alternative embodiment of the second embodiment is represented. For the sake of clarity, analogous numerical references are used to denote elements of the same or similar functions or structures.

Alternatively, with reference to FIG. 9C, the radially external portion 42' is fixed while the radially internal portion 41' is movable and forms the movable portion 4'. The controllable moving member 9 allows the internal movable portion 4', 41' to be moved radially inwardly downstream in order to reduce the radial thickness. Advantageously, in the second position B, the movable portion 4' is extended into the reverse air flow F-INV accelerated by the fan 11, thus avoiding the formation of a strong local depression.

As illustrated in FIG. 9C, the thinner internal air intake lip 23 causes separation D of the reverse air flow F-INV as it circulates from the internal wall 21 to the external wall 22. Due to its separation D, the reverse air flow F-INV does not intimately follow the shape of the air intake lip 23 and is spaced apart from it, thus avoiding the formation of a strong local depression as in prior art.

Figure 10A:
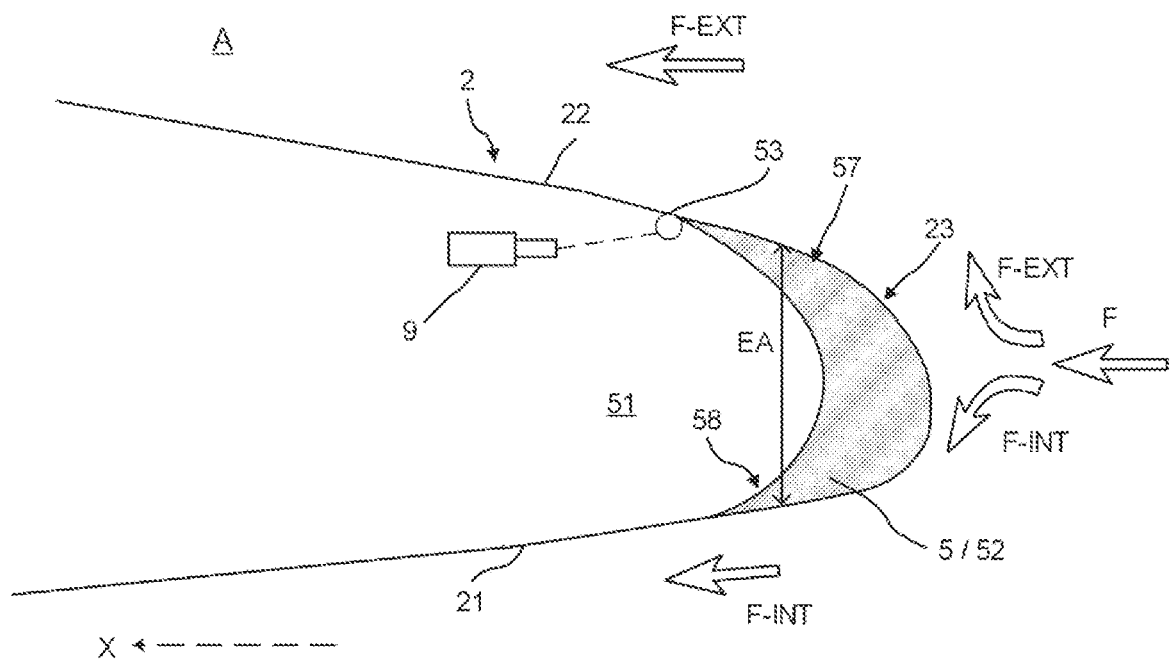
FIG. 10A and
FIG. 10B are schematic representations in a longitudinal cross-section view of an air intake comprising an upstream movable portion outwardly rotatably mounted, according to a first position and a second position.
Figure 10B:
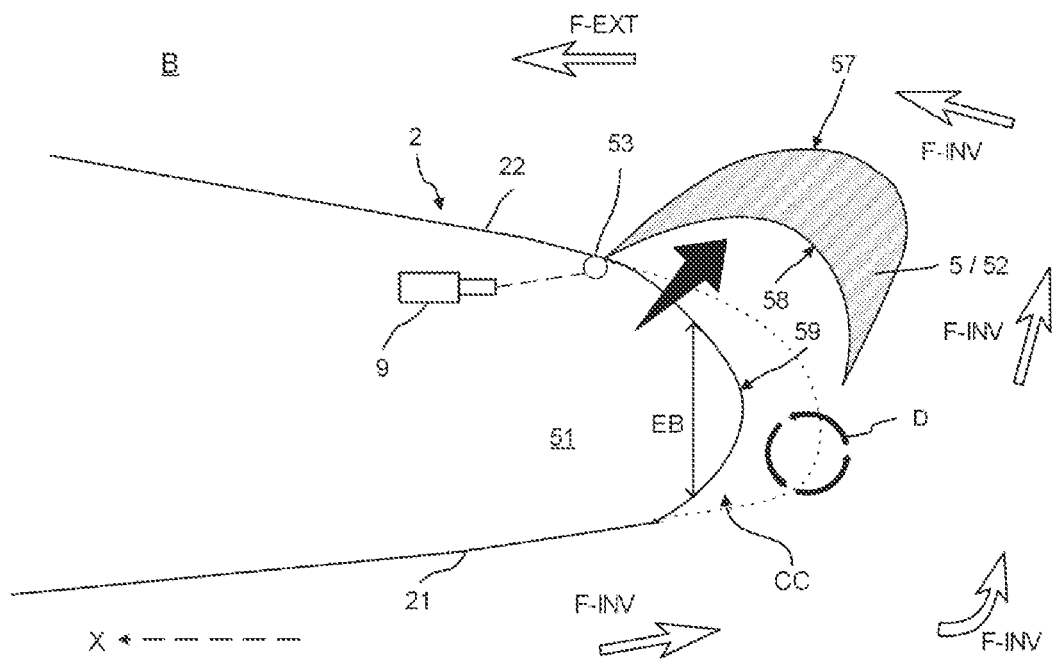

According to a third embodiment, with reference to FIGS. 10A and 10B, an upstream movable portion 5 which is rotatably moved about an azimuthal axis, orthogonal to axis X so as to allow the upstream movable portion 5 to move radially outwardly is represented.

As illustrated in FIGS. 10A and 10B, the air intake lip 23 comprises a fixed downstream portion 51 and an upstream movable portion 52 that forms the movable portion 5. The movable portion 5 is hinged to the fixed downstream portion 51 by a hinge 53 with an azimuthal axis that is positioned downstream of the upstream end of the air intake lip 23 at the external wall 22 as illustrated in FIG. 10A. In this embodiment, the movable portion 5 comprises an upstream convex surface 57 forming part of the air intake lip 23 and a downstream concave surface 58. The downstream concave surface 58 cooperates in a form-fitting manner with the fixed downstream portion 51 which has an upstream convex surface 59 as illustrated in FIG. 10B. In the second position B, a cavity CC is formed in place of the movable portion 5 in its first position A.

Analogously to previously, the air intake 2 comprises a controllable moving member 9 in order to rotate the movable portion 5 from the first position A to the second position B. Preferably, the controllable moving member 9 also allows the movable portion 5 to be moved from the second position B to the first position A. The air intake 2 may comprise one or more controllable moving members 9.

Still referring to FIGS. 10A and 10B, the controllable moving member 9 allows the upstream movable portion 5 to be moved downstream radially outwardly in order to reduce the radial thickness. In the second position B, the radial thickness EB of the air intake lip 23 corresponds to the radial thickness of the downstream fixed portion 51.

As illustrated in FIG. 10B, a thinner internal air intake lip 23 causes separation D of the reverse air flow F-INV as it circulates from the internal wall 21 to the external wall 22. Due to its separation D, the reverse air flow F-INV does not intimately follow the shape of the air intake lip 23 and is spaced apart from it, thus avoiding the formation of a strong local depression as in prior art. In other words, the performance during thrust reversal is increased. In practice, the reverse air flow F-INV comes into contact with the upstream convex surface 59 of the fixed part 51 and the movable portion 5, whose overall profile is not aerodynamic and causes a separation D.

Figure 10C:
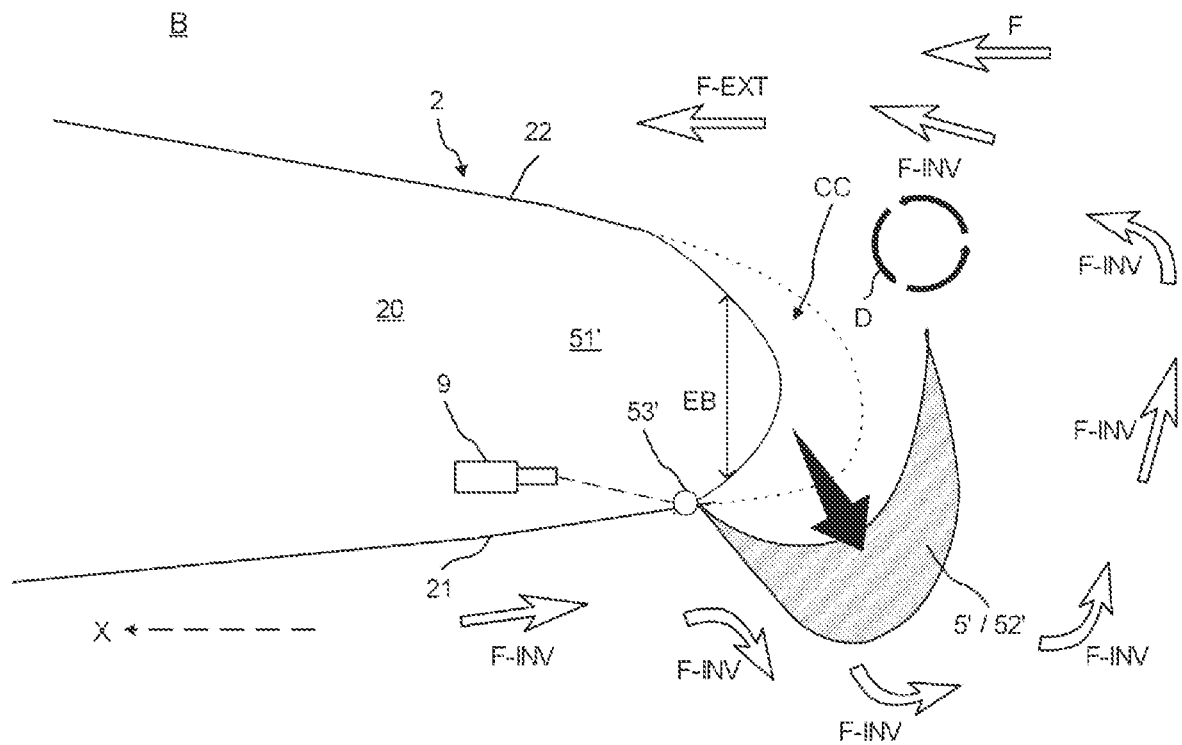
FIG. 10C is a schematic representation in a longitudinal cross-section view of an air intake comprising an upstream movable portion inwardly rotatably mounted, according to a second position.

With reference to FIG. 10C, an alternative embodiment of the third embodiment is represented. For the sake of clarity, analogous numerical references are used to denote elements of the same or similar functions or structures.

Alternatively, with reference to FIG. 10C, the movable portion 5' is hinged to the fixed downstream portion 51' by a hinge 53' having an azimuthal axis that is positioned downstream of the upstream end of the air intake lip 23 at the internal wall 21. The controllable moving member 9 allows the upstream movable portion 52' to be moved downstream radially inwardly in order to reduce the radial thickness. The movable portion 5', located in the circulation of the reverse air flow F-INV promotes separation D. Preferably, the movable portions 5' are distributed in multiple rows or the movable portions 5' of a same row overlap.

As illustrated in FIG. 10C, the thinner internal air intake lip 23 causes separation D of the reverse air flow F-INV as it circulates from the internal wall 21 to the external wall 22. Due to its separation D, the reverse air flow F-INV does not intimately follow the shape of the air intake lip 23 and is spaced apart from it, thus avoiding the formation of a strong local depression as in prior art.

Figure 11A:
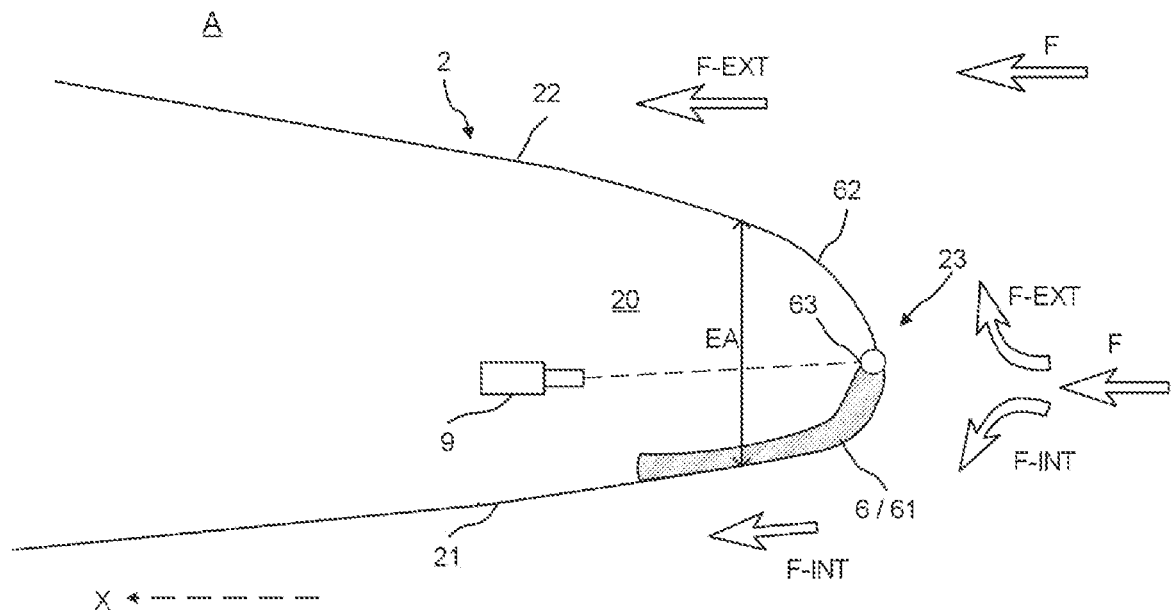
FIG. 11A and FIG. 11B are schematic representations in a longitudinal cross-section view of an air intake comprising an internal movable portion outwardly rotatably mounted, according to a first position and a second position.
Figure 11B:
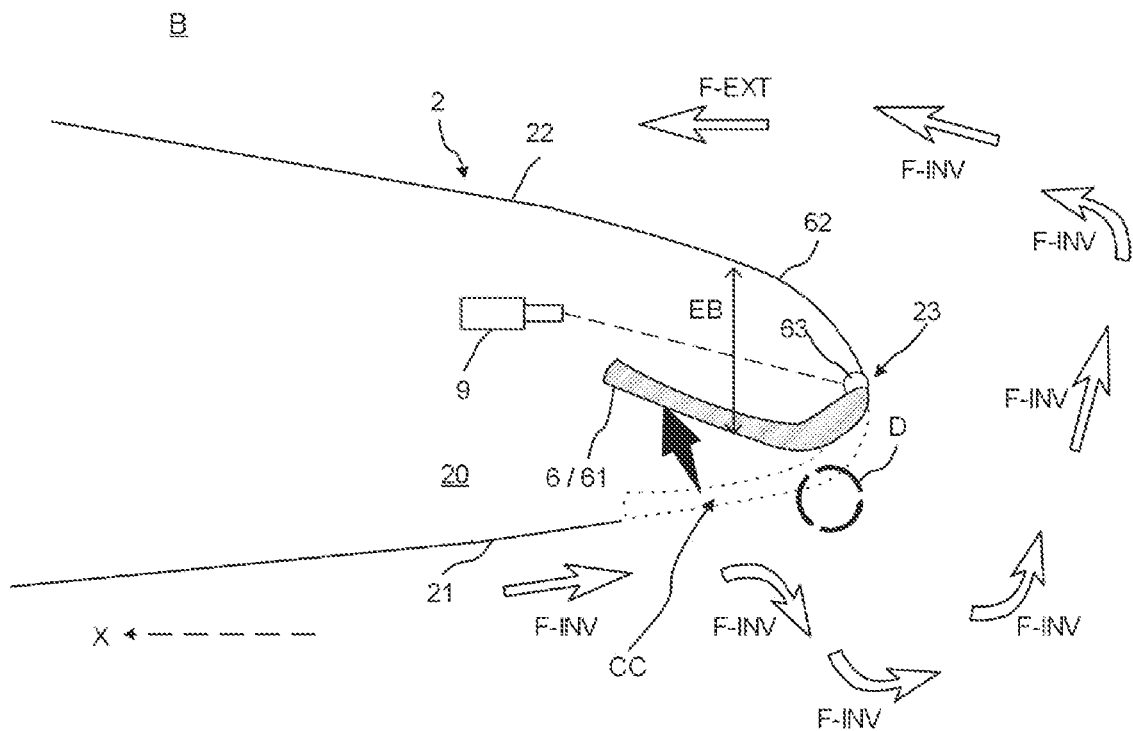

According to a fourth embodiment, with reference to FIGS. 11A and 11B, an internal movable portion 6, extending as an extension of the internal wall 21, which is rotatably moved about an azimuthal axis, orthogonal to axis X so as to allow the movable portion 6 to move radially outwardly into the annular cavity 20, is represented.

As illustrated in FIGS. 11A and 11B, the air intake lip 23 comprises a fixed radially external portion 62 and a movable radially internal portion 61 that forms the movable portion 6. The movable portion 6 is hinged to the fixed portion 62 by a hinge 63 with an azimuthal axis that is located at the upstream end of the air intake lip 23 as illustrated in FIG. 11A. In this embodiment, the movable portion 6 is in the form of an angled flap that is moved inside the annular cavity 20 to the second position B, that is, according to an internal movement. Preferably, the air intake lip 23 comprises an access opening to the annular cavity 20 which is protected by a movable cover member (not shown) configured to allow, on the one hand, passage of the movable portion 6 into the annular cavity 20 during the movement from the second position B and, on the other hand, to close the access opening when the movable portion 6 is positioned in the annular cavity 20. This advantageously allows to avoid a circulation of the reverse air flow F-INV in the annular cavity 20.

Preferably, the movable cover member is in the form of a flap comprising one or more movable portions. Of course, the cover member could be in various shapes.

Analogously to the foregoing, the air intake 2 comprises a controllable moving member 9 in order to rotatably move the movable portion 6 from the first position A to the second position B. Preferably, the controllable moving member 9 is also for moving the movable portion 6 from the second position B to the first position A. The air intake 2 may comprise one or more controllable moving members 9. Preferably, the controllable moving member 9 can also act on the cover member.

Still referring to FIGS. 11A and 11B, the controllable moving member 9 allows the movable portion 6, 61 to be moved radially outwardly downstream in order to reduce the radial thickness of the air intake lip 23. The movable portion 6, 6' is retracted into the annular cavity 20. In the second position B, the radial thickness EB of the air intake lip 23 corresponds to the radial thickness of the radially external fixed portion 62. In the second position B, a cavity CC is formed in place of the movable portion 6 in its first position A.

As illustrated in FIG. 11B, a thinner internal air intake lip 23 causes separation D of the reverse air flow F-INV as it circulates from the internal wall 21 to the external wall 22. Due to its separation D, the reverse air flow F-INV does not intimately follow the shape of the air intake lip 23 and is spaced apart from it, thus avoiding the formation of a strong local depression as in prior art. In other words, the performance during thrust reversal is increased.

Figure 11C:
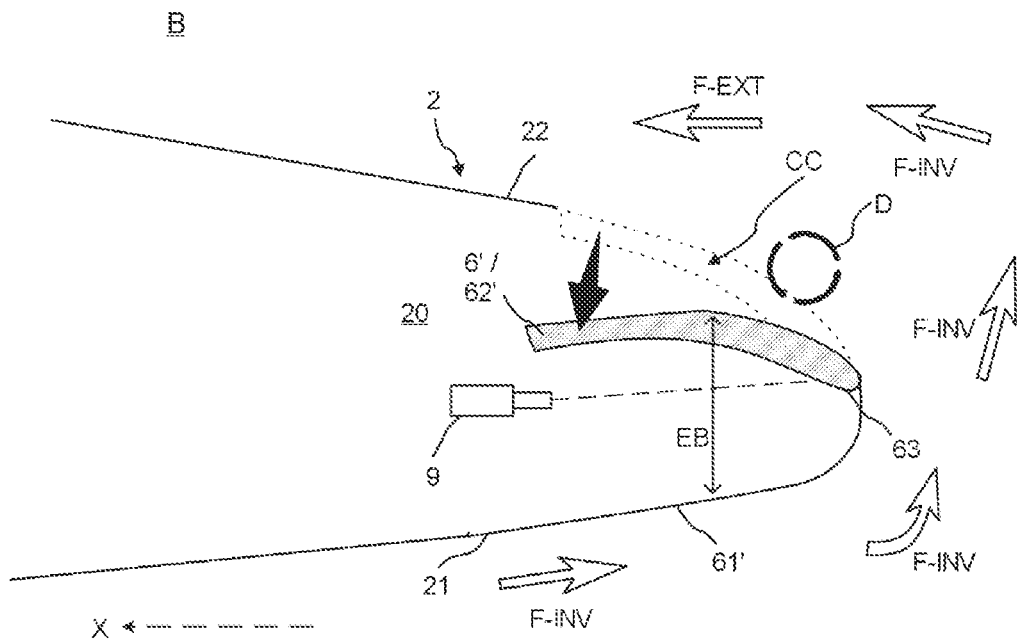
FIG. 11C is a schematic representation in a longitudinal cross-section view of an air intake comprising an internal movable portion inwardly rotatably mounted, according to a second position.

With reference to FIG. 11C, another alternative to the fourth embodiment is represented. For the sake of clarity, analogous numerical references are used to denote elements of the same or analogous functions or structures.

Alternatively, with reference to FIG. 11C, an external movable portion 6', 62', extending as an extension of the external wall 22, which is rotatably moved along an azimuthal axis, orthogonal to axis X so as to allow the movable portion 6' to move radially inwardly into the annular cavity 20, is represented. In this embodiment, the external movable portions 6' overlap in the annular cavity 20 to cover the circumference of the air intake 2. Alternatively, multiple rows of movable portions 6' may be provided, either successively controlling said movable portions 6', or axes of rotation tilted with respect to a plane transverse to axis X.

As illustrated in FIG. 11C, the thinner internal air intake lip 23 causes separation D of the reverse air flow F-INV as it circulates from the internal wall 21 to the external wall 22. Due to its separation D, the reverse air flow F-INV does not intimately follow the shape of the air intake lip 23 and is spaced apart from it, thus avoiding the formation of a strong local depression as in prior art.

Figure 12A:
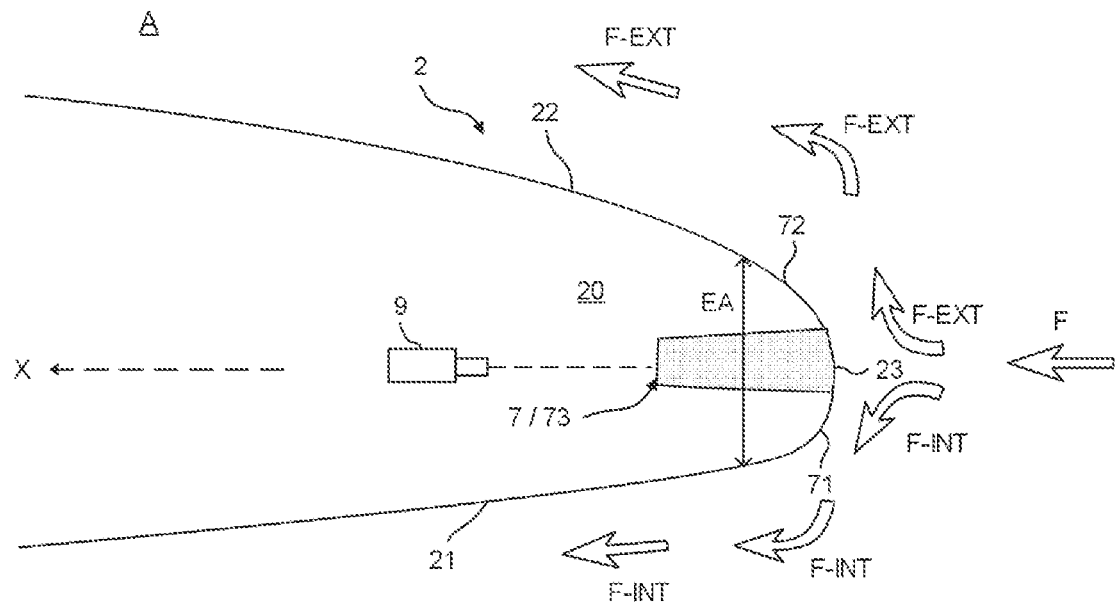
FIG. 12A and FIG. 12B are schematic representations in a longitudinal cross-section view of an air intake comprising an intermediate movable portion translationally mounted, according to a first position and a second position.
Figure 12B:
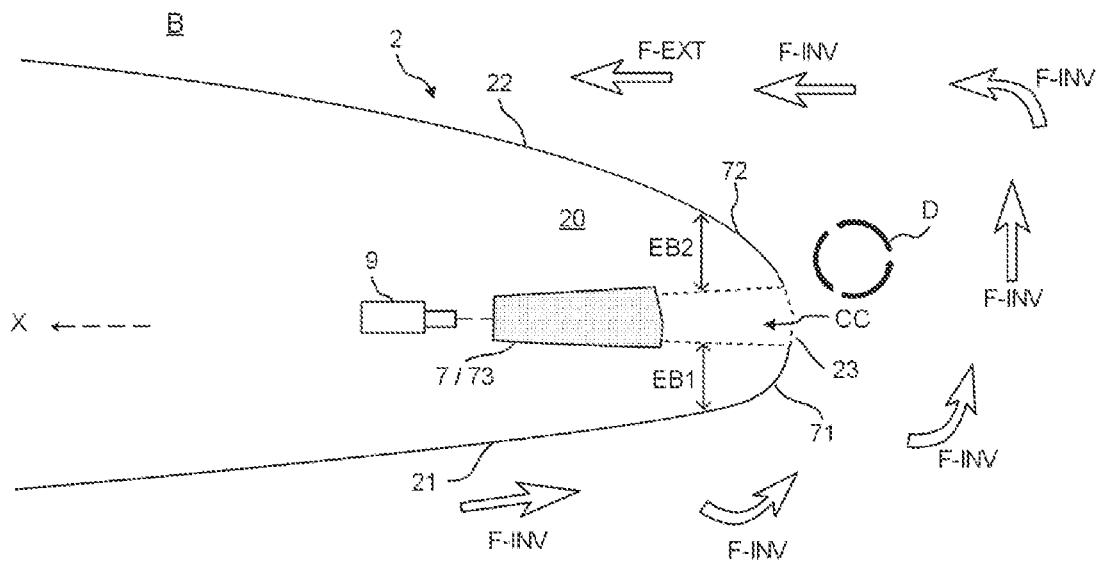

According to a fifth embodiment, with reference to FIGS. 12A and 12B, a movable intermediate portion 7 which is translationally moved along a direction parallel to axis X is represented. Nevertheless, it goes without saying that the translation axis could be tilted with respect to axis X.

As illustrated in FIGS. 12A and 12B, the air intake lip 23 comprises a radially internal portion 71, an intermediate portion 73 and a radially external portion 72. In this example, the radially internal portion 71 and the radially external portion 73 are fixed while the intermediate portion 73 is movable and forms the movable portion 7. In this embodiment, the movable portion 7 accounts for 30% to 90% of the radial thickness of the air intake lip 23. Preferably, the upstream end of the air intake lip 23 belongs to the intermediate portion 73.

Analogously to the foregoing, the air intake 2 comprises a controllable moving member 9 for translationally moving the intermediate portion 73 from the first position A to the second position B. Preferably, the controllable moving member 9 is also used to move the movable portion 7 from the second position B to the first position A. The air intake 2 may comprise one or more controllable moving members 9.

Still referring to FIGS. 12A and 12B, the controllable moving member 9 allows the intermediate portion 7, 73 to be moved downstream in order to reduce the radial thickness of the air intake lip 23. In the second position B, the radial thickness EB of the air intake lip 23 corresponds to the sum of the radial thicknesses EB1, EB2 of the radially internal portion 71 and the radially external portion 72. In the second position B, a cavity CC is formed in place of the movable portion 7 in its first position A, thereby advantageously forming a discontinuity between the radially internal portion 71 and the radially external portion 72 and improving the separation D.

Preferably, the intermediate portion 73 extends circumferentially and is preferably in the form of a substantially cylindrical part.

As illustrated in FIG. 12B, a thinner internal air intake lip 23 with an intermediate discontinuity causes a large separation D of the reverse air flow F-INV as it circulates from the internal wall 21 to the external wall 22. Due to its separation D, the reverse air flow F-INV does not intimately follow the shape of the air intake lip 23 and is spaced apart from it, thus avoiding the formation of a strong local depression as in prior art. In other words, the performance during thrust reversal is increased.

A method for operating the air intake 2 according to the invention previously set forth is described below. For the sake of clarity, the movement of a single movable portion is set forth, but it goes without saying that a plurality of movable portions may be moved concomitantly or sequentially.

During a thrust phase, the fan 11 allows an internal air flow F-INT, which is guided by the air intake 2 having an aerodynamic profile promoting thrust, to be accelerated. The movable portion 3, 3', 4, 4', 5, 5', 6, 6', 7 is in the first position A during the thrust of the turbojet engine 1, so that the air intake 2 has an aerodynamic profile so as to guide the air flow. The air intake lip 23 has a first radial thickness EA in the first position A.

During a thrust reversal phase of said turbojet engine 1, in particular following a modification of the pitch of the fan vanes 11, the method comprises a step of moving the movable portion 3, 3', 4, 4', 5, 5', 6, 6', 7 from the first position A to the second position B during which the movable portion is moved relative to the fixed portion in the second position B so that the air intake lip 23 has a second radial thickness EB which is smaller than the first radial thickness EA. The separation of the reverse air flow F-INV is promoted by the air intake lip of reduced thickness during the reverse thrust phase.

Advantageously, this movement step provides the aircraft with good performance both during a thrust phase, where the internal air flow F-INT is kept unchanged, and during a thrust reversal phase, where the movable portion 3, 3', 4, 4', 5, 5', 6, 6', 7 generates a separation D of the reverse air flow F-INV from the internal wall 21.

According to one aspect of the invention, only a part of the movable portions 3, 3', 4, 4', 5, 5', 6, 6', 7 is moved during the movement step to adapt to different operating (braking, etc.) conditions and achieve different degrees of separation at the circumference of the air intake 2. The reverse air flow is better controlled in order to achieve the desired reverse thrust. Analogously, in order to achieve an equivalent effect, the movable portions can be extended at different degrees.

By virtue of the invention, the performance of the turbojet engine 1 is significantly improved during the reverse thrust phase while maintaining the existing performance during the thrust phase. Indeed, the movable portion 3, 3', 4, 4', 5, 5', 6, 6', 7 generates, in the second position B, a separation D of the reverse air flow F-INV from the internal wall 21 allowing the whole reverse air flow F-INV to be oriented in a substantially axial direction with a sense opposite to the upstream air flow F, originating the thrust reversal, while generating reduced weight and drag. In the first position A, the air intake 2 advantageously maintains its aerodynamic profile.

The invention claimed is:

1. A method for operating an air intake of an aircraft turbojet engine nacelle extending along an axis X oriented from upstream to downstream in which an internal air flow circulates from upstream to downstream during a thrust phase and a reverse air flow from downstream to upstream during a thrust reversal phase, the air intake circumferentially extending about axis X and comprising an internal wall pointing to axis X and configured to guide the internal air flow and the reverse air flow, and an external wall, opposite to the internal wall, and configured to guide an external air flow around an exterior of the nacelle, the internal wall and the external wall being connected to each other by an air intake lip so as to form an annular cavity therebetween, the air intake lip comprising a first radial thickness and at least one fixed portion and at least one movable portion that is translationally movable between a first position and a second position, and wherein when the at least one movable portion of the air intake lip is in the first position the air intake lip has an aerodynamic profile that is configured to guide the internal air flow over the internal wall to promote a thrust phase, the method comprising:

a step of moving the at least one movable portion during a thrust reversal phase of said turbojet engine to promote reverse thrust by moving relative to the fixed portion to the second position so that the air intake lip comprises a second radial thickness when in the second position that is less than the first radial thickness, wherein the first radial thickness and the second radial thickness are measured in a same plane transverse to axis X, and wherein the at least one movable portion is rigid and is translationally mounted for translating in a downstream direction in moving to the second position.

2. The method according to claim 1, wherein the air intake lip comprises a plurality of movable portions distributed at a circumference of the air intake about axis X.

3. The method according to claim 1, wherein the air intake lip comprises a single movable portion circumferentially extending about axis X.

4. The method according to claim 1, wherein the air intake comprises at least one controllable moving member, the at least one controllable moving member moving the at least one movable portion from the first position to the second position.

5. The method according to claim 1, wherein said turbojet engine comprises a fan configured to provide reverse thrust.

6. An aircraft turbojet engine extending along an axis X oriented from upstream to downstream in which an internal air flow circulates from upstream to downstream during a thrust phase and a reverse air flow from downstream to upstream during a thrust reversal phase, said turbojet engine comprising:

a fan comprising variable pitch vanes configured to provide reverse thrust, a nacelle comprising an air intake circumferentially extending about axis X and comprising an internal wall pointing to axis X and configured to guide the internal air flow and the reverse air flow, and an external wall, opposite to the internal wall, configured to guide an external air flow around an exterior of the nacelle, wherein the internal wall and the external wall are connected to each other by an air intake lip so as to form an annular cavity therebetween, the air intake lip comprising at least one fixed portion and at least one movable portion, the at least one movable portion being rigid and translationally mounted to move between:

a first position, in which the air intake lip has a first radial thickness and an aerodynamic profile that guides the internal air flow over the internal wall to promote thrust, and a second position, in which the at least one movable portion is configured to translationally move in a downstream direction relative to the at least one fixed portion so that the air intake lip has a second radial thickness which is less than the first radial thickness, and wherein the first radial thickness and the second radial thickness are measured in a same plane transverse to axis X.

7. The aircraft turbojet engine according to claim 6, wherein the air intake comprises at least one controllable moving member configured to move the at least one movable portion from the first position to the second position.

* * * * *